(12) United States Patent
Seuntiens et al.

(10) Patent No.: US 9,476,567 B2
(45) Date of Patent: Oct. 25, 2016

(54) OPTICAL ELEMENT, A LIGHTING SYSTEM AND A LUMINAIRE FOR PROVIDING A SKYLIGHT APPEARANCE

(75) Inventors: Petrus Johannes Hendrikus Seuntiens, Hoogeloon (NL); Bart Andre Salters, Eindhoven (NL); Gabriel-Eugen Onac, Veldhoven (NL); Berent Willem Meerbeek, Eindhoven (NL); Evert Jan Van Loenen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 195 days.

(21) Appl. No.: 14/233,541

(22) PCT Filed: Jul. 19, 2012

(86) PCT No.: PCT/IB2012/053693
§ 371 (c)(1),
(2), (4) Date: Jan. 17, 2014

(87) PCT Pub. No.: WO2013/011481
PCT Pub. Date: Jan. 24, 2013

(65) Prior Publication Data
US 2014/0160720 A1 Jun. 12, 2014

(30) Foreign Application Priority Data
Jul. 20, 2011 (EP) .................................. 11174654

(51) Int. Cl.
*F21V 7/00* (2006.01)
*F21V 9/02* (2006.01)
(Continued)

(52) U.S. Cl.
CPC . *F21V 9/02* (2013.01); *E04B 9/32* (2013.01); *F21S 8/04* (2013.01); *F21V 11/08* (2013.01); *G02B 6/005* (2013.01); *E06B 3/66376* (2013.01); *F21Y 2101/02* (2013.01); *G02B 6/0053* (2013.01); *G02B 6/0055* (2013.01); *G02B 6/0076* (2013.01)

(58) Field of Classification Search
CPC ........ F21V 11/14; F21V 9/02; F21S 19/005; G02B 6/0055
USPC ................................ 362/1–2, 606–607, 618
See application file for complete search history.

(56) References Cited

U.S. PATENT DOCUMENTS 4,956,751 A 9/1990 Kano
5,020,252 A * 6/1991 De Boef ............. G09F 13/0409
362/223

(Continued)

FOREIGN PATENT DOCUMENTS

CN 101858129 A 10/2010
EP 2031296 A1 3/2009
(Continued)

*Primary Examiner* — Sean Gramling
(74) *Attorney, Agent, or Firm* — Meenakshy Chakravorty (57) ABSTRACT

An optical element, a lighting system and a luminaire is provided. The optical element comprises a plate 100 and a plurality of collimating means. The optical element is to be used in front of a light source comprising a light emitting surface 106, and the optical element is configured to obtain a skylight appearance. The plate 100 is to be arranged parallel to the light emitting surface 106. The plate 100 is opaque and comprises a plurality of holes 104. The plate 100 further comprises a reflective surface 102 which is to be arranged parallel to the light emitting surface 106. The reflective surface 102 is light reflective in a predetermined spectral range to obtain a blue light emission 100. The plurality of collimating means collimate a part of the light received from the light source to obtain a collimated light beam 112 in a specific direction. Each one of the collimating means comprises one of the plurality of holes of the plate 104.

15 Claims, 7 Drawing Sheets

(51) Int. Cl.
  *E04B 9/32* (2006.01)
  *F21S 8/04* (2006.01)
  *F21V 11/08* (2006.01)
  *F21V 8/00* (2006.01)
  *F21Y 101/02* (2006.01)
  *E06B 3/663* (2006.01)

(56) References Cited

U.S. PATENT DOCUMENTS

| | | | |
|---|---|---|---|
| 5,613,757 A | 3/1997 | Polk | |
| 6,457,844 B2 * | 10/2002 | Hess | F21S 8/04 362/290 |
| 7,481,550 B1 | 1/2009 | Schreiber et al. | |
| 2001/0048599 A1 | 12/2001 | Hess | |
| 2005/0265029 A1 | 12/2005 | Epstein et al. | |
| 2008/0273323 A1 | 11/2008 | Ladstaetter | |
| 2009/0290334 A1 * | 11/2009 | Ivey | F21K 9/17 362/219 |

FOREIGN PATENT DOCUMENTS

| | | |
|---|---|---|
| GB | 2243223 A | 10/1991 |
| JP | 59071026 A | 4/1984 |
| JP | 2006126843 A | 5/2006 |
| JP | 2010176031 A | 8/2010 |
| WO | 2010052605 A1 | 5/2010 |
| WO | 2012140579 A2 | 10/2012 |

* cited by examiner

OPTICAL ELEMENT, A LIGHTING SYSTEM AND A LUMINAIRE FOR PROVIDING A SKYLIGHT APPEARANCE

FIELD OF THE INVENTION

The invention relates to optical elements which are used to create a skylight appearance.

BACKGROUND OF THE INVENTION

Published patent application US2008/0273323A1 discloses a specific luminaire design to emit light which is experienced by users as pleasant. The luminaire comprises a main light source and an additional light source. The additional light source emits light of a color spectrum that is different from the color spectrum of the main light source. Light of the main light source and of the additional light source are mixed before being emitted through the main light exit window of the luminaire. Further, a portion of the light emitted by the additional light source is guided to a side or a rear side of the luminaire in order to be emitted through an additional light exit window on said side or said rear side of the luminaire. Such a luminaire provides an opportunity to emit white light through the main light exit window and also to emit light of a different color, for example blue light, via the additional light exit window. To some extent, this provides a skylight experience because white light and, possibly, blue light are emitted. However, if a viewer looks towards the luminaire, irrespective of the viewing angle, the luminaire is perceived as a white light emitting luminaire and the area around it (the roof or the wall) is perceived as a blue light reflective area. A skylight in a roof provides, on sunny days, a directed light beam of sunlight, and blue light in other directions. Thus, the viewer who looks towards the skylight and who is inside the directed light beam of sunlight sees a white skylight, while viewers outside the directed light beam see a blue skylight. In other words, the luminaire of the cited patent application provides a limited skylight experience.

Further, the luminaire according to the cited patent application has a complicated structure and requires a relatively large number of optical elements, such as, at least two light sources which each emit light of a different color distribution, a means to mix the light of both light sources, and a light guiding structure to guide light of the additional light source towards the additional light exit window. Thus, the known luminaire for creating an attractive light emission is relatively expensive.

SUMMARY OF THE INVENTION

It is an object of the invention to provide a more cost-effective optical element for creating a skylight appearance.

A first aspect of the invention provides an optical element. A second aspect of the invention provides a lighting system. A third aspect of the invention provides a further lighting system. A fourth aspect of the invention provides a luminaire. Advantageous embodiments are described herein below.

An optical element in accordance with the first aspect of the invention comprises a plate and a plurality of collimating means. The optical element is suitable for use in front of a light source comprising a light emitting surface, and the optical element is configured to obtain a skylight appearance. The plate is to be arranged parallel to the light emitting surface. The plate is opaque and comprises a plurality of holes. The plate further comprises a reflective surface to be arranged parallel to the light emitting surface. The reflective surface is light reflective in a predetermined spectral range to obtain a blue light emission. The plurality of collimating means collimate a part of the light received from the light source to obtain a collimated light beam in a specific direction. Each one of the collimating means comprises one of the plurality of holes of the plate.

The optical element according to the invention uses the collimating means, which comprise the plurality of holes in the plate, to obtain a collimated beam of light which has the same characteristics as the light that is received from the light source. Especially, if substantially white light is received, the collimated light beam is perceived by people as direct sunlight falling through a skylight or a window. On sunny days a relatively large part of the daylight is directed white light. Thus, the collimated beam of light provides a part of the daylight experience. Further, the surface, which is reflective in the predetermined spectral range, provides, via reflection, blue light. The obtained blue light emission corresponds to the bluish light which is also available in daylight that falls through a skylight or a window. A viewer, who looks towards the optical element and who is not inside the directed collimated light beam of white light, sees a blue light source, which corresponds to the color of the sky on sunny days, that is also seen through a skylight or a window. Consequently, if the optical element is used in front of the light source which emits white light, the optical element provides a light emission that comprises a directed collimated (white) light beam and bluish light. Thus, the optical element provides a light emission that is perceived as a skylight on a sunny day.

The optical element does not have a complex structure and therefore may be manufactured relatively cheaply. Further, because it is a plate, the optical element may be manufactured at relatively low costs in large sizes comparable to the size of a window or a skylight. In combination with a light source having a relatively large light emitting surface, the optical element may create the appearance of a window, or a skylight, through which daylight of a sunny day falls into a room. If such light conditions are present in the room, the well-being of the people in the room is influenced positively, and, for example, the productivity of the people may increase.

The light that is received from the light source may be white light. This means that the wavelength distribution of the white light is such that a color point of the white light is a color point on or close to a black body line of the color space. The human naked eye perceives light with a color point on the black body line as being in the range of cool-white to warm-white light. Direct sunlight is also white light and has a color point close to or on the blackbody line of the color space. Direct sunlight also varies, depending on the time of day and atmospheric conditions, between cool-white and warm-white.

The blue light emission has a spectral distribution in which wavelengths in the blue spectral range are dominant with respect to wavelengths outside the blue spectral range such that the human naked eye perceives the light as light of a blue color.

It is to be noted that the light emitting surface may be a surface of a light source, or, for example, a diffuser which diffuses light that is received from one or more light emitters. Further, the light emitting surface may be a virtual plane in which a plurality of light emitters are arranged and, in an example, the plurality of light emitters act as a Lambertian light source and all emit light at the same side of the virtual plane.

The plate is opaque, which means that the plate is not a good light transmitter. Not more than 10% of the light that impinges on the opaque plate is transmitted through the material of the plate. The light is transmitted through the holes.

Optionally, at least a part of the blue light emission is outside the collimated light beam.

Optionally, the plate is not a plate of a blue synthetic material.

Optionally, the plate comprises a first side to receive light from the light source, and the plate comprises a second side which is opposite the first side. The second side faces the ambient and the reflective surface is configured to reflect ambient light. Blue ambient light reflection is obtained. The reflective surface of the optical element is arranged towards the ambient and as such ambient light is used to obtain a blue light emission. Thus, no additional light source or additional optical means are required to obtain the blue light emission, and hence the structure of the optical element is not complex and remains cost effective.

Optionally, the holes are light transmitting channels through the plate to form the collimating means and the holes extend from the first side towards the second side in the specific direction. The light transmitting channels are the collimation means, so that a collimation means of a relatively simple construction is obtained. To obtain a sufficient level of collimation, the diameter of the light transmitting channels is smaller than the length of the channel and, optionally, the diameter is significantly smaller than the length of the channel. The structure of the optical element is not complex because the optical element is a plate with a plurality of through-channels and at least one (blue) reflective surface. Channels through the plate in the specific direction may be manufactured by means of drilling or laser cutting to create the channels. Thus, the manufacturing costs of such an optical element are low.

Optionally, the light transmitting channels have walls, being surfaces of the plate facing the interior of the light transmitting channels. At least a part of the walls of the light transmitting channels are reflective in the predetermined spectral range to obtain a blue diffuse light emission at relatively large light emission angles with respect to the specific direction. Thus, in addition to the reflective surface, the walls of the light transmitting channels are also reflective in the predetermined spectral range such that light that is received from the light source by the light transmitting channels and which impinges on the walls is reflected as diffuse blue light. The light which impinges on the walls (and is reflected by the walls) has relatively small light emission angles with respect to the specific direction of the collimated light beam. Light which has relatively small light emission angles with respect to the specific direction will most probably end up in the collimated light beam instead of being reflected by the walls. Thus, if there is no ambient light, light of the light source is used to obtain a blue light emission and dependency on the ambient light conditions for obtaining a blue light emission is reduced.

Optionally, the optical element comprises a further plate arranged parallel to the plate and being separated from the plate by a gap. Each one of the plate and the further plate comprises a plurality of holes. Multiple holes of the plate form a pair with a nearest hole in the further plate. A line through a central point of the holes of the pair forms an imaginary central axis of the pair. All imaginary central axes of pairs are arranged in parallel. The pairs of holes collimate a part of the light received from the light source to obtain a collimated light beam in a direction of the imaginary central axes of the pairs. Thus, each pair of holes forms one of the collimating means. The further plate comprises a further reflective surface. The reflective surface of the plate faces the further reflective surface of the further plate.

In the arrangement, light of the light source, which has a light transmission path through both holes of each one of the pairs of holes, is transmitted through the optical element and is, consequently, collimated to a collimated light beam. The light which ends up in the collimated light beam has a relatively small light emission angle with respect to the imaginary central axes of the pairs. Light which falls through one of the holes of one of the pairs of holes, but not through the other hole of the specific one of the pairs of holes, impinges on the plate or the further plate and is reflected one or multiple times between the plate and the further plate. This light has relatively large light emission angles with respect to the imaginary central axes of the pairs. Because the reflective surface is only reflective to light in the predetermined spectral range, the light which is reflected between the plates becomes blue light. The light that is reflected one or multiple times travels via reflection through the gap between the plates and leaves the gap through a certain hole of the plate or of the further plate and is then emitted into the ambient. This emission into the ambient is at relatively large light emission angles with respect to the imaginary central axes of the pairs. Thus, the optical element emits (white) light in a directed collimated light beam and emits blue light at least outside the directed collimated light beam. Such a light emission is comparable with the light emission of a skylight or a window on a sunny day and therefore the optical element provides a skylight appearance. The structure of the optical element is relatively simple, because it comprises two plates with holes, and may therefore be manufactured cost effectively.

According to a second aspect of the invention, a lighting system is provided which comprises an optical element according to the first aspect of the invention and a light guide. The light guide comprises a light output window and a light input window. The light output window faces the optical element and is arranged to emit light towards the optical element. The light input window is arranged to receive light from a light source. The light guide is an effective and efficient means to create a relatively large light emission surface and consequently a relatively cost-effective lighting system may be obtained which has a skylight appearance along a relatively large light emission surface. Optionally, the light guide is arranged in a so-called side-emitting arrangement, wherein the light input window is arranged perpendicularly to the light output window.

Optionally, the lighting system further comprises a reflector arranged at a side of the light guide opposite the light exit window of the light guide. The light guide comprises light outcoupling structures. Multiple holes of the plate form a pair with a nearest light outcoupling structure. A line through a central point of the hole and a central point of the light outcoupling structure forms an imaginary central axis of the pair. All imaginary central axes of the pairs are arranged in parallel to collimate a part of the light received from the light source to obtain a collimated light beam in a direction of the imaginary central axes of the pairs. Thus, each pair forms one of the collimating means. The reflective surface of the plate faces the light exit window of the light guide to obtain a blue light emission at, at least, light emission angles outside the light emission angles of the collimated light beam.

In the above-discussed arrangement, the outcoupling structures act as point-sources which emit light towards the optical element. Light which is outcoupled by the outcoupling structures and which falls through the holes, has a light emission angle close to the imaginary central axes of the pairs, and this light forms the directed collimated light beam. Light rays which originate from the outcoupling structures and which have light emission angles outside the light emission angles of the directed collimated light beam, fall on the reflective surface of the optical element and are reflected in the predefined spectral range such that the light becomes bluish. Subsequently, this bluish light is reflected one or more times between the reflector and the reflective surface before the light exits the lighting system through a hole (at a relatively large light emission angle with respect to the imaginary central axes of the pair). Consequently, the lighting system provides a skylight appearance. The construction of the lighting system is not very complex because of the small amount of components used and therefore a cost-effective lighting system may be obtained.

The reflector may be reflective on both sides, or on one side, which is the side which faces the light guide.

Optionally, the lighting system comprises a further light guide arranged at a side of the optical element that is opposite another side of the optical element which faces the light guide. The further light guide has two parallel surfaces arranged parallel to the plate of the optical element. The reflective surface of the plate faces the further light guide. The further light guide comprises light outcoupling structures at subareas of at least one of the parallel surfaces of the light guide. The subareas are separate from subareas of the at least one of the parallel surfaces of the light guide through which the collimated light beam is transmitted. The outcoupling structures are arranged to emit light towards the reflective surface of the plate.

In the above-discussed optional arrangement, the collimating means of the optical element provide a direct collimated light beam which is transmitted through the further light guide, and the further light guide emits light towards the reflective surface of the plate such that this light is reflected as blue light. The further light guide receives light from an additional light source. Consequently, the further light guide is used for an active blue light emission and the lighting system according to the above-discussed optional arrangement does not depend, for example, on the presence of ambient light to obtain the blue light emission. The outcoupling structures of the further light guide are arranged in subareas which are outside the directed collimated light beam to prevent distortions of the collimated light beam.

According to a third aspect of the invention, a further lighting system is provided which comprises an optical element according to the first aspect of the invention and which also comprises TLeds. TLeds comprise a light transmitting tube arranged as a light exit window and comprising Light Emitting Diodes. The TLeds are arranged to emit light towards the optical element and are arranged in the virtual plane.

The further lighting system is comparable to the previously discussed lighting system, however, the light guide with outcoupling structures is replaced by the plurality of TLeds. The light of the TLeds is collimated and directed by the combination of the optical element and the relative position of the optical element to the TLeds. In the near future, TLeds will become relatively cheap and form advantageous light sources to create a cost-effective further lighting system.

TLeds are basically retro-fit light tubes, wherein the light is generated by Light Emitting Diodes (LEDs). The light emitting diodes may emit white light and the light tube comprises diffusing material to obtain a relatively uniform light emission through a part of the light tube. In other embodiments, the TLeds comprise LEDs which emit light of a specific color, or which emit UV light, and the light tube comprises luminescent material which absorbs at least a part of the light emitted by the LEDs and converts the light to light of another color such that a substantially white light output is obtained.

Optionally, a diffuser is arranged in between the TLeds and the optical element. The diffuser acts as a light emitting surface which has a relatively uniform light emission distribution along its surface.

According to an alternative embodiment, an alternative lighting system is provided which comprises an Organic Light Emitting Diode (OLED) comprising a light emitting surface, and which comprises an optical element according to the first aspect of the invention for receiving light from the Organic Light Emitting Diode.

According to a fourth aspect of the invention, a luminaire is provided which comprises the optical element according to the first aspect of the invention, or which comprises the lighting system according to the second aspect of the invention, or which comprises the further lighting system according to the third aspect of the invention.

The luminaire according to the fourth aspect of the invention provides the same benefits as the optical element according to the first aspect of the invention, the lighting system according to the second aspect of the invention and the further lighting system according to the third aspect of the invention and has similar embodiments with similar effects as the corresponding embodiments of, respectively, the optical element, the lighting system or the further lighting system.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the system, the method, and/or of the computer program product, which correspond to the described modifications and variations of the system, can be carried out by a person skilled in the art on the basis of the present description.

It should be noted that items denoted by the same reference numerals in different Figures have the same structural features and the same functions, or are the same signals. Where the function and/or structure of such an item have been explained, there is no necessity for repeated explanation thereof in the detailed description.

The figures are purely diagrammatic and not drawn to scale. Particularly for clarity, some dimensions are exaggerated strongly

DETAILED DESCRIPTION

Figure 1:
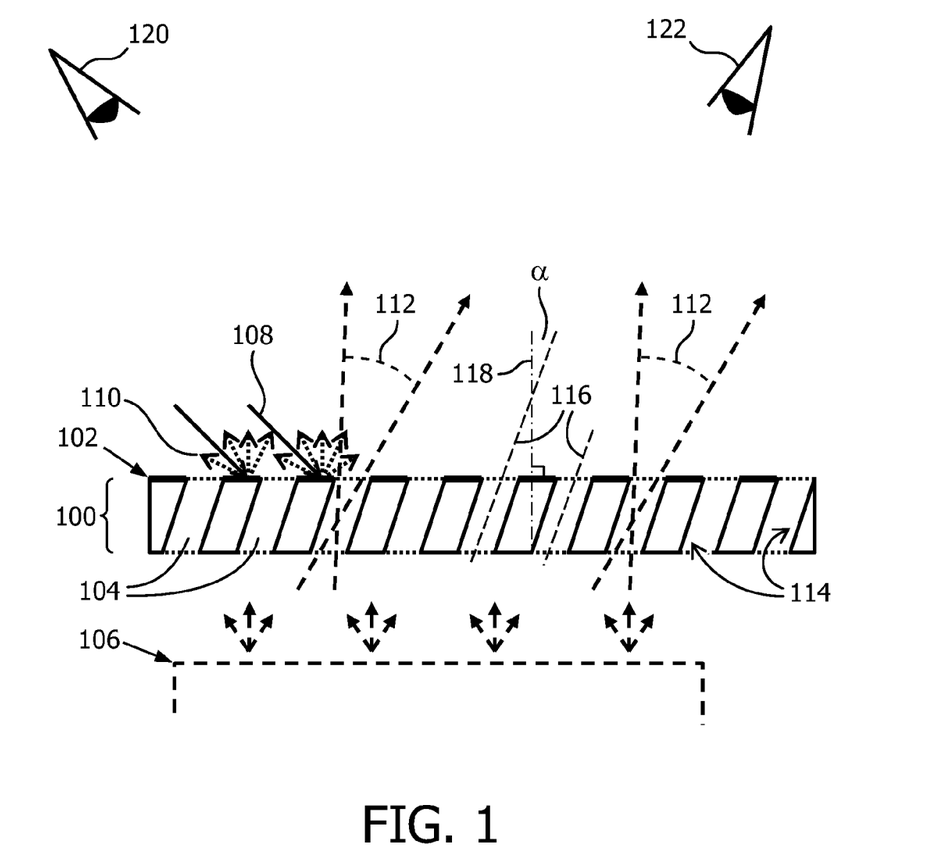
FIG. 1 schematically shows a cross-section of an optical element according to the first aspect of the invention, FIG. 2 schematically shows a cross-section of a lighting system according to the second aspect of the invention, FIG. 3 schematically shows a cross-section of a lighting system which comprises two light guides, FIG. 4 schematically shows a cross-section of a lighting system which comprises an optical element constructed of two plates, FIG. 5a schematically shows a cross-section of a lighting system, wherein light outcoupling structures and holes in the plate form collimating means, FIG. 5b schematically shows a 3d view of the lighting system according to FIG. 5a, FIG. 6 schematically shows a cross-section of a further lighting system according to the third aspect of the invention, and FIG. 7 schematically shows a 3d view of a room which comprises a luminaire according to the fourth aspect of the invention.

A first embodiment is shown in FIG. 1. FIG. 1 schematically presents a cross-section of an optical element according to the first aspect of the invention. The optical element comprises a plate 100 comprising a plurality of light transmitting channels 104 which act as a collimating means. The plate 100 is arranged parallel to a light emitting surface 106 of, for example, a light source with a large light emitting surface, or a lighting system which comprises a plurality of light emitters in a virtual plane.

A top surface 102 of the plate, which is a surface arranged parallel to the light emitting surface 106, is reflective in a predetermined spectral range to obtain a blue light emission. The top surface 102 is, for example, provided with a blue coating or a solid layer of a blue material. Ambient light 108 which impinges on the top surface 102 is reflected and mainly blue light 110 is reflected. If the top surface 102 is diffusely reflective, blue light is reflected in a plurality of directions. In general, the ambient light is relatively diffuse and therefore the reflected blue light will be a diffuse blue light emission. Thus, a viewer 120 who looks towards the plate 100 sees a blue surface as a result of the blue light emission 110 of the top surface 102.

The plurality of light transmitting channels 104 are arranged between the top surface 102 and a surface of the plate 100 which receives light from the light emitting surface 106. Each light transmitting channel allows direct transmission of light from the light emitting surface 106 at an angle in between a maximum and a minimum light emission angle. The light emission of the light emitting surface 106 comprises more light emission angles and therefore the light transmitting channels 104 collimate the received light. Each light transmitting channel 104 has a central axis 116 and at least a significant number of the central axes are arranged parallel to obtain a plurality of collimated light beams in a direction of the parallel arranged central axes 116. In FIG. 1, the outer light rays of two collimated light beams 112 in the direction of the central axes 116 are drawn. Especially, if the light transmitting channels 104 have a relatively small diameter compared to their length, the collimated light beams only comprise light emission directions which form a small angle with respect to the central axes 116 of the light transmitting channels 104. In FIG. 1 the central axes 116 of the light transmitting channels 104 form an angle α with the normal 118 to the plate 100 and, as a result, the average light emission direction of the collimated light beams 112 is equal to an angle α which is formed with the normal 118 to the plate 100.

Therefore, the specific direction may be described with the angle α. The walls 114 of the light transmitting channels are light absorbing to absorb light which is emitted into the light transmitting channels 104 at light emission angles outside the light emission angles of the collimated light beams 112.

Figure 2:
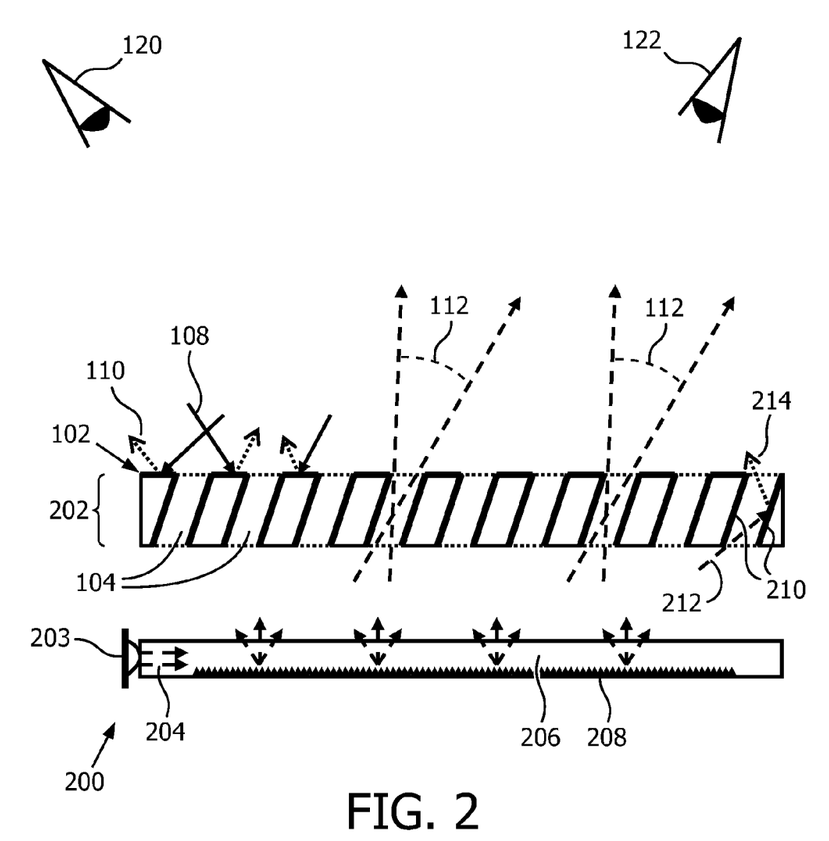

FIG. 2 schematically presents a cross-section of a lighting system 200 according to the second aspect of the invention. Lighting system 200 comprises a light emitter 203, a light guide 206 and an optical element 202 according to the first aspect of the invention. The light emitter 203 emits white light 204 into the light guide 206. The light guide 206 comprises outcoupling structures 208 which redirect the light, which is guided through the light guide, towards the optical element 202. The optical element 202 receives white light from the combination of the light emitter 203 and the light guide 206. The optical element 202 is similar to the optical element 100 of FIG. 1, however, walls 210 of the light transmitting channels 104 are light reflective in a predetermined spectrum to obtain a blue light emission at light emission angles outside the collimated light beams 112. In FIG. 2, white light ray 212 which impinges on the wall 210 of the specific light transmitting channel 104 is reflected by the wall 210 and the non-blue light components are absorbed such that a blue light ray 214 is emitted into the ambient. Thus, if the light emitter 203 is in operation, the optical element 202 emits collimated light beams 112 of white light in a specific direction, and the optical element 202 emits diffuse blue light at light emission angles outside the collimated light beams 112. Further, the reflective surface 102 of the optical element still reflects the blue components of the ambient light 108.

The light guide 206 may be made of a light transmitting material such as, for example, glass or Silicone. The outcoupling structures 208 may, for example, be recesses in the light guide 206, protrusions projecting from the light guide 206, scratches made in a surface of the light guide 206, or a diffusely reflective paint applied to the surface of the light guide 206. Further, the density of the outcoupling structures may be uniform or non-uniform and may be arranged such that a substantially homogenous light emission is obtained along a light exit window of the light guide 206.

Figure 3:
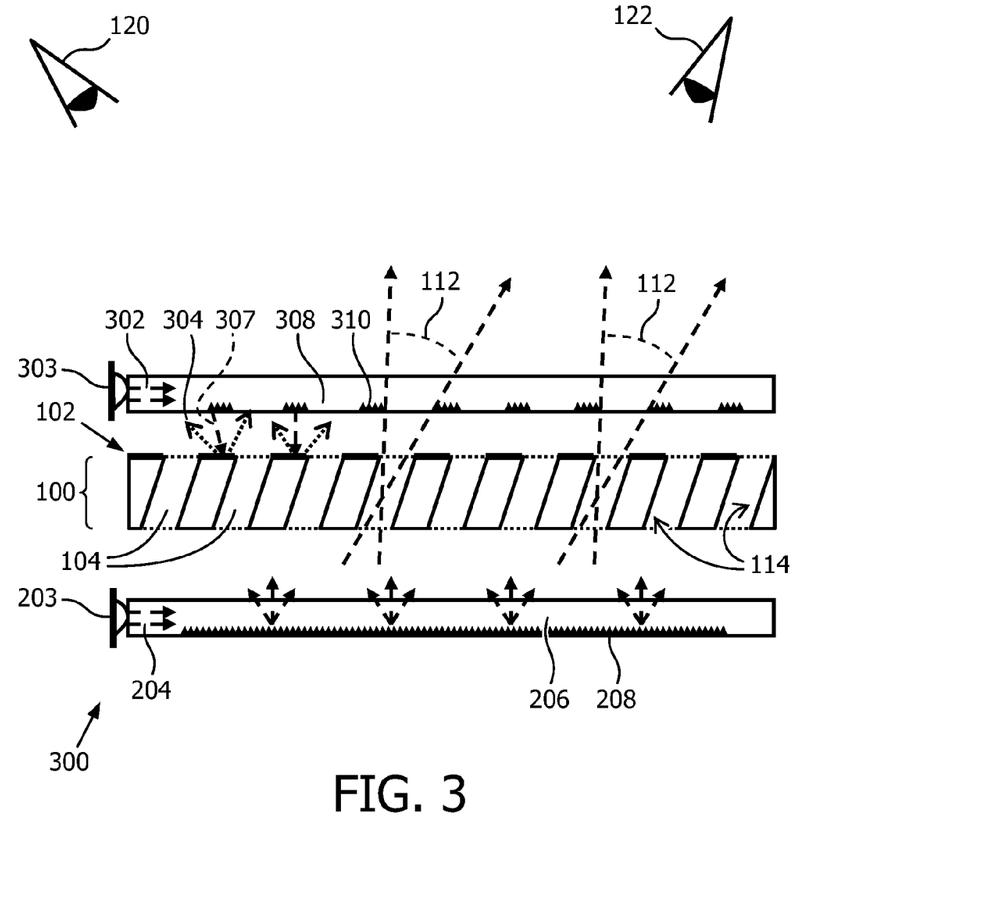

FIG. 3 schematically presents a cross-section of lighting system 300. Lighting system 300 comprises a first light guide 308, an optical element 100, a second light guide 206, a light emitter 203 and a further light emitter 303. The light emitter 203 and the second light guide 206 have the same function and structural features as discussed in the context of FIG. 2. The optical element 100 has the same structural features as discussed in the context of FIG. 1, however, the function of the reflective surface 102 is not to reflect ambient light, but to reflect light that is received from the first light guide 308. The first light guide 308 receives light from the further light emitter 303 via a light input window. The further light emitter 303 emits light 302 which comprises at least light in the blue spectral range—optionally, the further light emitter 303 emits white light into the first light guide 308. The first light guide 308 comprises light outcoupling structures 310 which redirect light that is guided through the first light guide 308 towards the reflective surface 102 of the optical element. The outcoupling structures are not present in subareas of the first light guide through which the collimated light beams 112 are transmitted to prevent distortion of the collimated light beams 112. In FIG. 3, the light outcoupling structures 310 are present on a surface of the first light guide 308 which faces the optical element 100. Alternatively, the light outcoupling structures 310 are present at a surface of the first light guide 308 that faces the ambient, and in this arrangement, they still redirect the light that is guided in the first light guide 308 towards the optical element 100. In FIG. 3, a light ray 307 is drawn which is outcoupled from the first light guide 308 and which impinges on the reflective surface 102. The reflective surface 102 absorbs the non-blue components of the light ray 307 and reflects blue light 304 into a plurality of directions. The blue light 304 is transmitted through the first light guide 308 and is emitted into the ambient of the lighting system 300 at a plurality of light emission angles. Thus, viewer 122 mainly sees white light of the collimated light beams 112, while viewer 120 sees the blue light 304.

Figure 4:
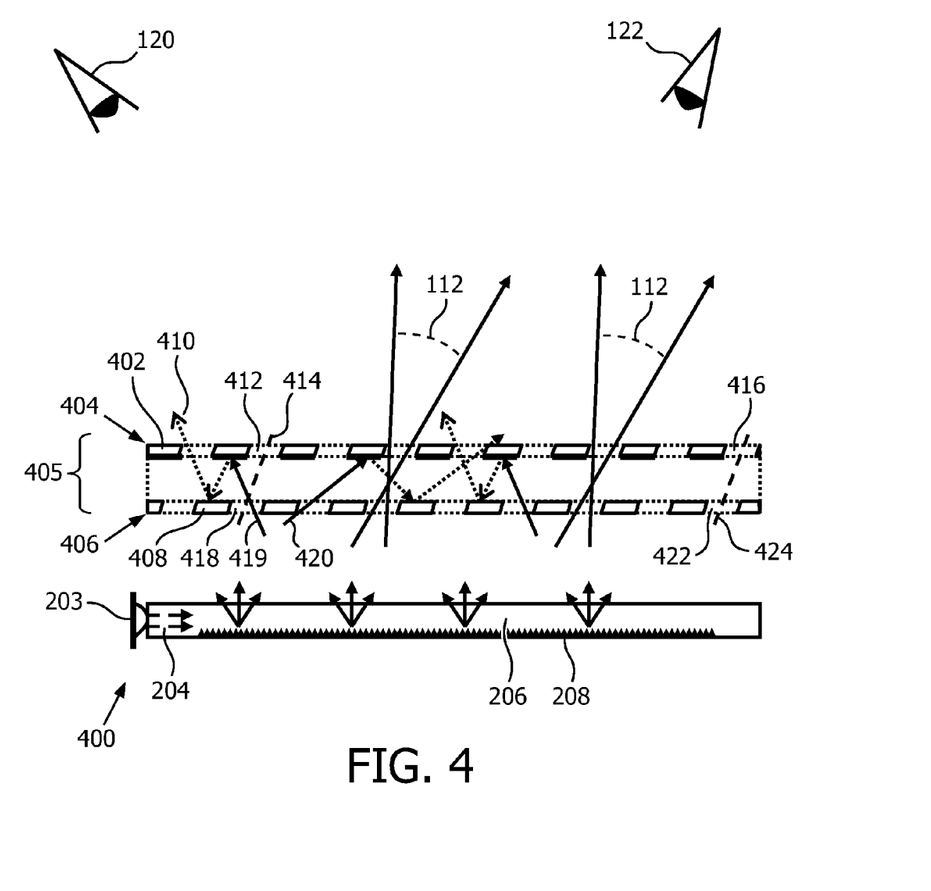

FIG. 4 schematically presents a cross-section of a further embodiment of a lighting system 400. The lighting system 400 comprises a light emitter 203, a light guide 206 and an optical element 405. The light emitter 203 and the light guide 206 have the same function and the same structural features as discussed in the context of FIG. 2.

The optical element 405 comprises a first plate 402 and a second plate 408. The first plate 402 and the second plate 408 are arranged parallel to each other and a gap is present between the plates 402, 408. The first plate 402 has a blue-reflective surface 404 which faces the gap. If light impinges on the blue-reflective surface 404, light in the blue spectral range is reflected towards the second plate 408. The second plate 408 has a reflective surface 406 which reflects light. The first plate 402 has a plurality of holes 412, 416. The second plate 408 has also a plurality of holes 418, 422. Each hole of the first plate 402 forms a pair with a nearest hole of the second plate 408. For example, a first pair is formed by hole 416 and hole 422, and an imaginary central axis through the centers of the holes 416, 422 forms a central axis 424 of a first pair. For example, a second pair is formed by hole 412 and hole 418, and an imaginary central axis through the centers of the holes 412, 418 forms a central axis 414 of a second pair. The central axis 424 of the first pair and the central axis 414 of the second pair are arranged parallel to each other.

If light from the light guide 206 falls through the holes of the second plate 408, a part of this light is directly transmitted towards the holes of the first plate 402 and a collimated light beam 112 is transmitted into the ambient. A central axis of the collimated light beam 112 has substantially the same direction as the central axes 424, 414 of the pairs. Not all light transmitted through the holes of the second plate 408 is directly transmitted through a hole of the first plate 402—a part of the light impinges on the blue-reflective surface 404, as is shown for light ray 419. Light ray 419 is reflected by the blue-reflective surface 404 and becomes a blue light ray. After another reflection at the reflective surface 406 of the second plate 408, the blue light ray 410 is emitted into the ambient. The blue light ray 410 has a transmission angle outside the collimated light beams 112 of white light. Light that enters the gap between the second plate 408 and the first plate 402 at light transmitting angles outside the collimated light beams 112 is at least reflected twice before it is emitted into the ambient, and during at least one reflection, wavelengths of the light in the non-blue spectral range are absorbed. Thus, at light emission angles outside the collimated light beam 112, blue light is emitted into the ambient. In FIG. 4, two viewers, who are present in the ambient, are looking towards the lighting system 400. Viewer 122 is inside the collimated light beams 112 and sees a white light emission by the lighting system 400. Viewer 120 is outside the collimated light beams 112 and sees a blue light emission. This is experienced by viewers 120, 122 as a skylight appearance.

Figure 5A:
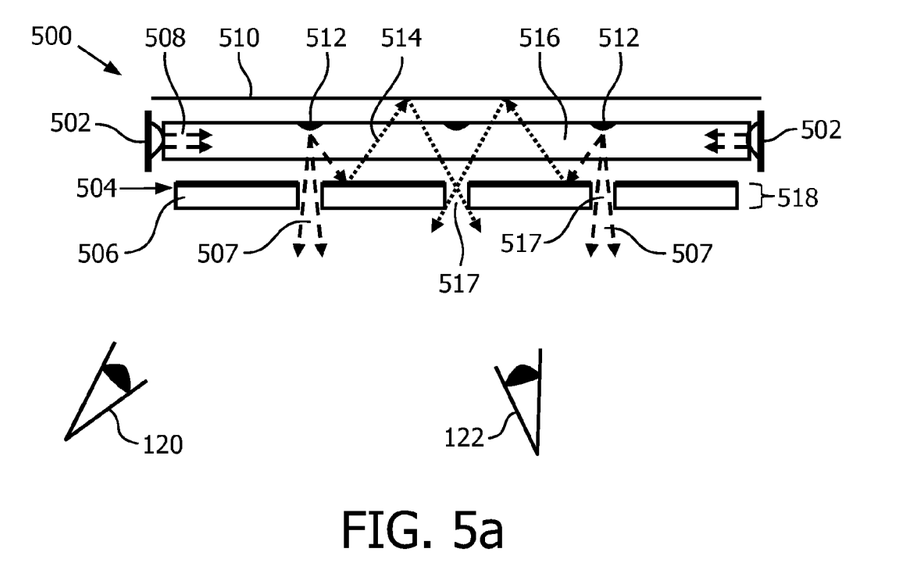

FIG. 5a presents a cross-section of an alternative lighting system 500. The lighting system comprises a reflector 510, a light guide 516, two light sources 502 and an optical element 518. The optical element 518 is a plate 506 which comprises holes 517. The plate 506 has a blue-reflective surface 504 which faces the light guide 516. In the embodiment of FIG. 5a, the light guide 516 has two light input windows. The light guide 516 receives white light from the light sources 502 via the light input windows. The light guide 516 further comprises light outcoupling structures 512 which outcouple the white light towards the optical element 518 in a plurality of light emission directions. The outcoupling structures 512 are, for example, diffusely reflective dots of white paint. Near each hole 517 of the optical element 518, one outcoupling structure 512 is present, and each outcoupling structure 512 forms a pair with the nearest hole 517 of the plate 518. An imaginary axis through the centre of the outcoupling structure and the hole of the pair defines a specific direction in which the white light emission is emitted, and the size of the hole 517 compared to the distance from the outcoupling structure 512 to the hole 517 defines the amount of collimation. It is to be noted that the imaginary axes of a large number of pairs are arranged parallel to each other such that the white light emission of the lighting system 500 is substantially in the specific direction. Thus, a large number of collimated light beams 507 of white light are emitted towards, for example, viewer 122. The outcoupling structures 512 emit light in more directions than only the light emission directions leading to the formation of the collimated light beams 507 of white light. The light in other light emission directions impinges on the blue-reflective surface 504 of the optical element 518 and is reflected as blue light 514 towards the light guide 516. At the other side of the light guide 516, there is arranged a reflector 510 which reflects the blue light 514 back towards the optical element 518 such that it may be emitted into the ambient via one of the holes 517. The blue light 514 that is emitted via the holes 517 has light emission angles outside the collimated light beams 507 and may be seen by a viewer 120 who is not inside the white light emission of the lighting system 500.

Figure 5B:
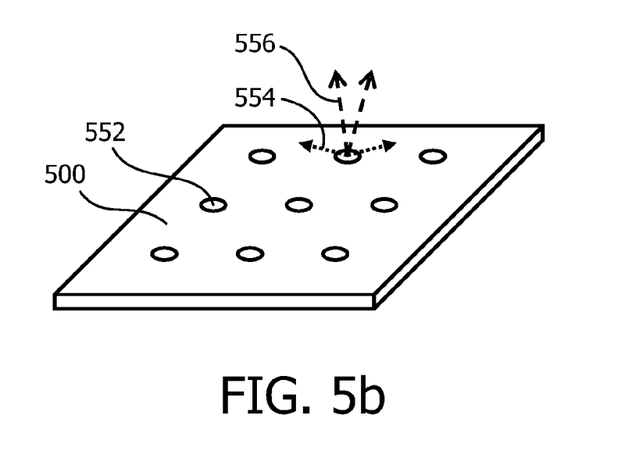

FIG. 5b schematically presents a three dimensional view of the lighting system 500. The lighting system 500 has a plurality of holes 552 which each emit a collimated white light beam 556 and which each emit blue light 554 at light emission angles outside the collimated white light beams 556.

Figure 6:
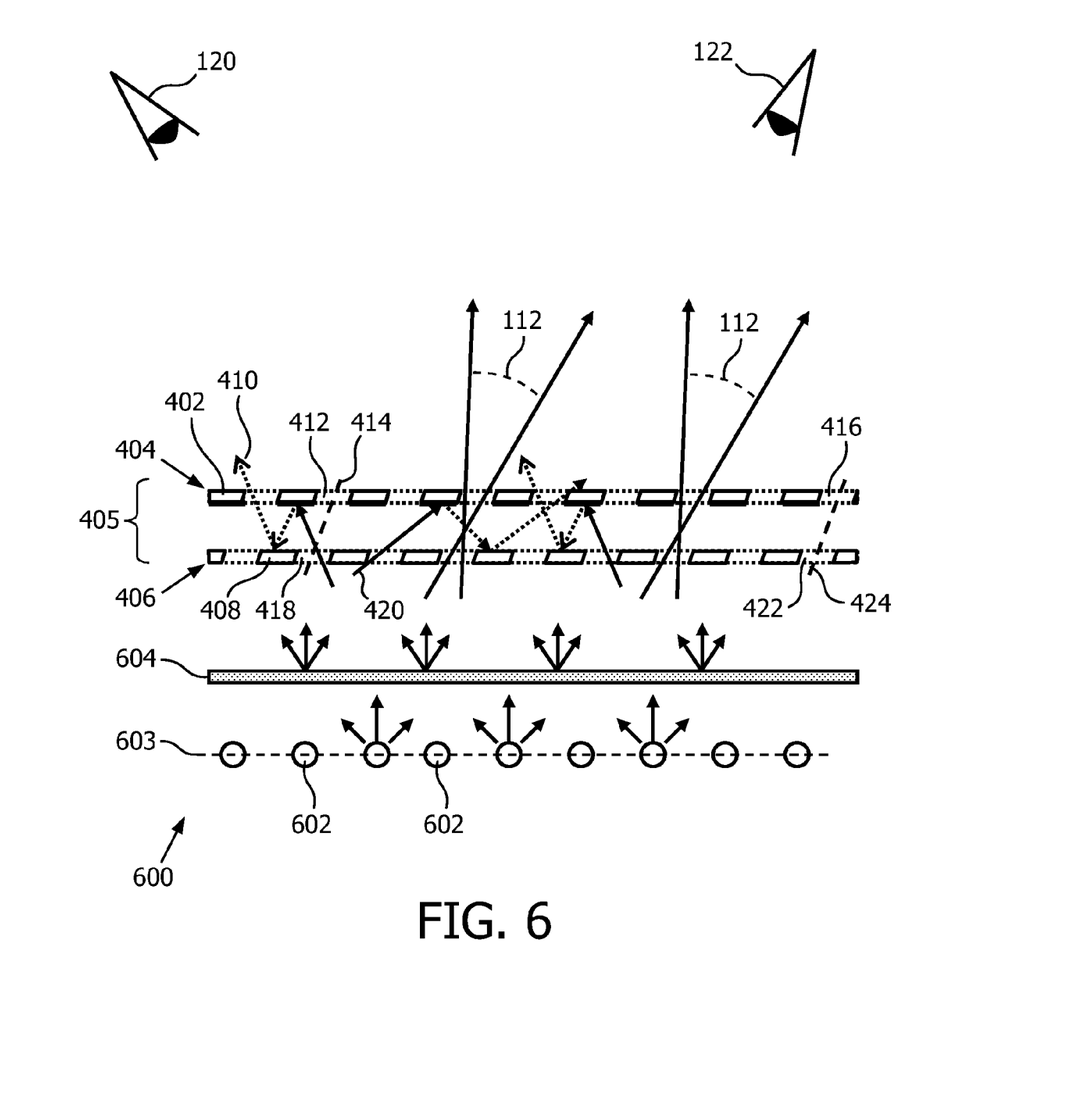

FIG. 6 schematically presents a cross-section of another embodiment according to the invention. A lighting system 600 is shown which comprises the optical element 405, a diffuser 604 and TLeds 602. Optical element 405 has the same function and structure as optical element 405 of FIG. 4. The diffuser 604 forms a light emitting surface which emits white light towards the optical element 405. Behind the diffuser, seen in a direction away from the optical element 405, TLeds 602 are arranged in an imaginary plane 603 and are arranged to emit white light towards the diffuser 604. The diffuser 604 is used to obtain a relatively uniform light emission towards the optical element 405 and to prevent hot spots from being visible to the viewers 120, 122. TLeds are tubes of a light transmitting material which emit white light through the tube. Inside the TLed there is arranged a plurality of Light Emitting Diodes which directly emit the white light towards the tube, or which emit blue or UV light towards a luminescent material applied to the surface of the light transmitting tube. Such luminescent material converts at least a part of the blue or UV light to light of another spectral range such that a white light emission through the tube is obtained.

Alternatively, diffuser 604 is not present and the TLeds directly emit light towards the optical element 405. In such an embodiment it may be useful to use one TLed for one row of pairs of holes 412, 416, 418, 422 and to arrange the TLed also on the central axis 414, 424 of the pairs.

Figure 7:
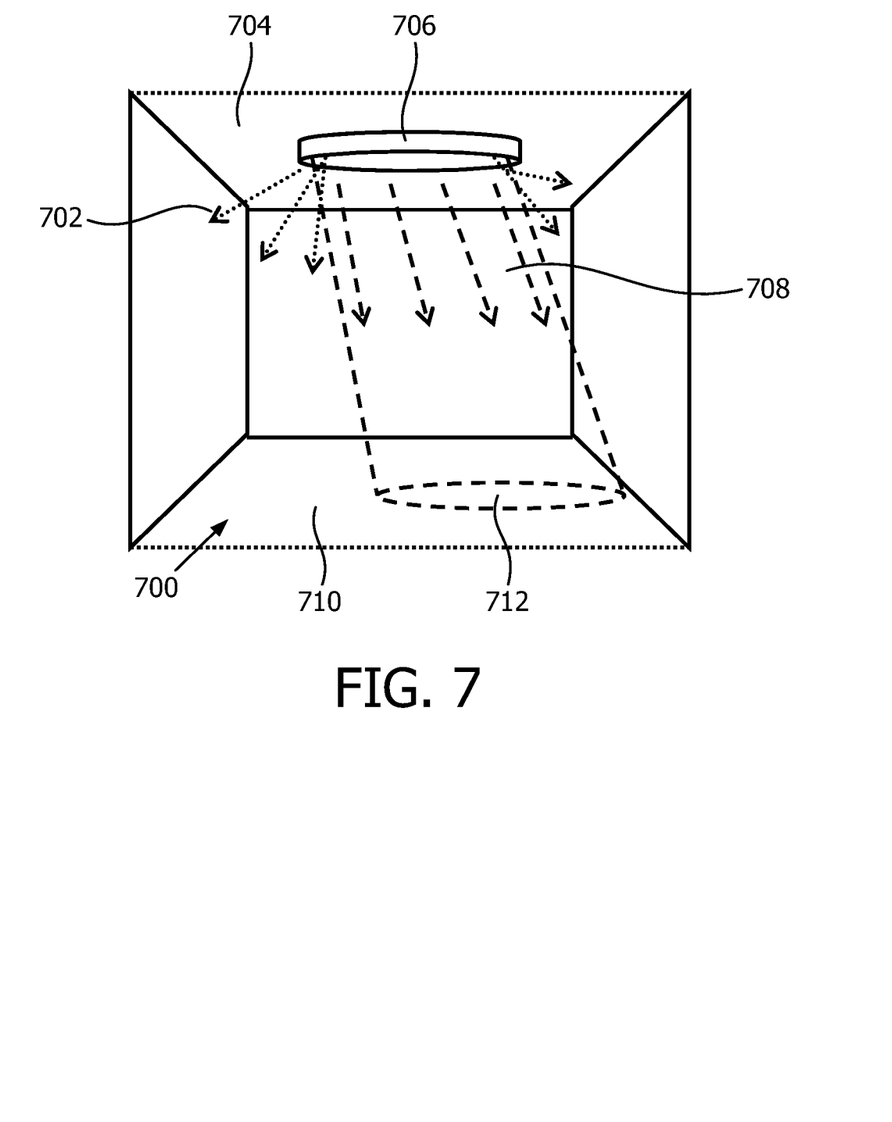

FIG. 7 schematically presents the interior of a room 700. A cylindrical luminaire 706 which comprises a lighting system (not shown) according to the second aspect of the invention is provided at the ceiling 704 of the room 700. Alternatively, the luminaire comprises the optical element (not shown) according to the first aspect of the invention or the luminaire comprises the further lighting system (not shown) according to the third aspect of the invention.

The luminaire 706 emits a collimated directed light beam 708 which has a circular footprint 712 on the floor 710 of the room 700. People present in the room perceive this light emission as sunlight which falls through a skylight. The luminaire 706 further emits blue light 702 at least in a plurality of directions outside the collimated directed light beam 708. Thus, if a person looks towards the luminaire 706 when he is not inside the collimated directed light beam 708, he perceives the luminaire 706 as a blue surface which is comparable to the blue sky on a sunny day.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An optical element for use in front of a light source comprising a light emitting surface, the optical element being configured to obtain a skylight appearance including a direct sunlight effect and a bluish light emission, said optical element comprising:
   a plate configured to be arranged parallel to the light emitting surface, the plate being opaque and comprising a plurality of holes, the plate further comprising a reflective surface configured to be arranged parallel to the light emitting surface, the reflective surface being light reflective in a predetermined spectral range for obtaining a blue light emission, and
   a plurality of collimating means for obtaining a collimated light beam in a specific direction by transmitting a part of the light received from the light source, wherein said part has a light emission angle substantially in the specific direction, each one of the collimating means comprising one of the plurality of holes of the plate, wherein said optical element is configured such that, when said plate and said reflective surface are arranged parallel to the light emitting surface, light emitted from a side of said plate outputting said collimated light beam appears to have a first color along said specific direction and appears more bluish than said first color along a direction that is different than said specific direction.

2. The optical element according to claim 1, wherein said side is a first side facing the ambient and including the reflective surface for reflecting ambient light to obtain a blue ambient light reflection and wherein the plate further includes a second side for receiving light from the light source, the second side being opposite the first side.

3. The optical element according to claim 2, wherein the holes are light transmitting channels through the plate to form the collimating means, and the holes extend from the second side towards the first side in the specific direction.

4. The optical element according to claim 3, wherein said light emission angle is a first light emission angle and wherein the light transmitting channels have walls being surfaces of the plate and facing the interior of the light transmitting channels, at least a part of the walls of the light transmitting channels are reflective in the predetermined spectral range for obtaining a blue diffuse light emission at light emission angles that are larger than said first light emission angle.

5. The optical element according to claim 1, wherein said plate is a first plate, wherein said plurality of holes are a plurality of first holes, wherein said reflective surface is a first reflective surface and wherein the optical element comprises a second plate arranged parallel to the first plate and being separated from the first plate by a gap, wherein
   the second plate comprises a plurality of second holes,
   wherein at least a subset of the first holes and at least a subset of the second holes form pairs of holes such that each hole of the at least a subset of the first holes forms a respective pair of said pairs with a respective nearest hole of the plurality of second holes, wherein each given pair of the pairs of holes includes a respective imaginary central axis formed through a central point of the holes of said given pair, and wherein the imaginary central axes of said pairs of holes are arranged in parallel and the pairs of holes are arranged to collimate said part of the light received from the light source to obtain a respective collimated light beam in a direction of the imaginary central axes of said pairs of holes, each pair of said pairs of holes forming one of the collimating means, and
   wherein the second plate comprises a second reflective surface, the first reflective surface facing the second reflective surface.

6. A lighting system comprising:
   the optical element according to claim 1; and
   a light guide comprising a light output window and a light input window, the light input window being arranged to receive the light from the light source and the light output window facing the optical element and being arranged to emit the light received from the light source towards the optical element.

7. The lighting system according to claim 6, comprising a reflector arranged at a side of the light guide opposite the light output window of the light guide, wherein
   the light guide comprises light outcoupling structures, multiple holes of the plurality of holes forming a pairs such that each hole of the multiple holes forms a respective pair of said pairs with a respective nearest light outcoupling structure of the light outcoupling structures, wherein each given pair of said pairs includes a respective imaginary central axis formed through a central point of the hole of the given pair and a central point of the outcoupling structure of the given pair, wherein the imaginary central axes of the pairs being arranged in parallel for collimating said part of the light received from the light source to obtain a respective collimated light beam in a direction of the imaginary central axes of the pairs, and each pair of the pairs forming one of the collimating means, and wherein the reflective surface of the plate faces the light output window of the light guide for obtaining the blue light emission at light emission angles outside the light emission angles of the respective collimated light beams.

8. The lighting system according to claim 6, wherein said side is a first side, wherein the light guide is a first light guide and wherein the lighting system further comprises a second light guide arranged at said first side of the optical element, said first side being opposite another side of the optical element facing the first light guide, the second light guide including two parallel surfaces being arranged parallel to the plate of the optical element, wherein the reflective surface of the plate faces the second light guide, and the second light guide further comprises light outcoupling structures at subareas of at least one of the parallel surfaces of the second light guide, wherein the subareas are separate from subareas of the at least one of the parallel surfaces of the second light guide through which the collimated light beam is transmitted, and wherein the outcoupling structures are arranged to emit light towards the reflective surface of the plate.

9. A lighting system comprising;

the optical element according to claim 1; and

TLeds comprising a light transmitting tube arranged as a light exit window and comprising Light Emitting Diodes, the TLeds being arranged to emit light towards the optical element and being arranged in the virtual plane.

10. The lighting system according to claim 9, further comprising a diffuser arranged in between the TLeds and the optical element.

11. A luminaire comprising the optical element according to claim 1.

12. A lighting system for use in front of a light source comprising a light emitting surface, the system being configured to obtain a skylight appearance including at least one of a direct sunlight effect or a bluish light emission, said lighting system comprising:

an optical element including a plate configured to be arranged parallel to the light emitting surface, the plate being opaque and comprising a plurality of holes, the plate further comprising a reflective surface configured to be arranged parallel to the light emitting surface, the reflective surface being light reflective in a predetermined spectral range for obtaining a blue light emission, wherein said optical element further comprises a plurality of collimating means for obtaining a collimated light beam in a specific direction by transmitting a part of the light received from the light source, wherein said part has a light emission angle substantially in the specific direction, each one of the collimating means comprising one of the plurality of holes of the plate; and a light guide including a light guide surface arranged to receive said collimated light beam, wherein said light guide faces said reflective surface and comprises light outcoupling structures at subareas of said light guide surface that are separate from subareas of the light guide surface through which the collimated light beam is transmitted.

13. The lighting system according to claim 12, wherein the outcoupling structures are arranged to emit light towards the reflective surface of the plate.

14. The lighting system according to claim 13, wherein the light guide surface is one of two parallel surfaces included in said light guide, wherein said two parallel surfaces are arranged parallel to the plate of the optical element.

15. The lighting system according to claim 14, further comprising a second light guide including a light output window and a light input window, the light input window being arranged to receive the light from the light source and the light output window facing the optical element and being arranged to emit the light received from the light source towards the optical element.

* * * * *